US008900084B2

(12) United States Patent
Kato et al.

(10) Patent No.: US 8,900,084 B2
(45) Date of Patent: Dec. 2, 2014

(54) GEAR DEVICE

(75) Inventors: Masanari Kato, Tsu (JP); Koji Nakamura, Tsu (JP)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 14/232,036

(22) PCT Filed: Jun. 28, 2012

(86) PCT No.: PCT/JP2012/004190
§ 371 (c)(1),
(2), (4) Date: Jan. 10, 2014

(87) PCT Pub. No.: WO2013/011639
PCT Pub. Date: Jan. 24, 2013

(65) Prior Publication Data
US 2014/0196554 A1 Jul. 17, 2014

(30) Foreign Application Priority Data
Jul. 15, 2011 (JP) .................. 2011-156634

(51) Int. Cl.
F16H 1/32 (2006.01)
F16H 19/08 (2006.01)

(52) U.S. Cl.
CPC ............. *F16H 19/08* (2013.01); *F16H 1/32* (2013.01); *F16H 2001/323* (2013.01)
USPC ........................................ 475/168

(58) Field of Classification Search
None
See application file for complete search history.

(56) References Cited

U.S. PATENT DOCUMENTS

| 5,188,572 A | 2/1993 | Yamaguchi et al. |
| 5,433,672 A * | 7/1995 | Tanaka et al. ................ 475/178 |
| 7,476,174 B2 * | 1/2009 | Fujimoto ....................... 475/177 |
| 2014/0206497 A1 * | 7/2014 | Nakamura et al. ............ 475/331 |

FOREIGN PATENT DOCUMENTS

| JP | 4-29988 | 7/1992 |
| JP | 2523068 | 10/1996 |
| JP | 11-210843 | 8/1999 |
| JP | 2000-213605 | 8/2000 |
| JP | 2005-47006 | 2/2005 |
| JP | 2006-183848 | 7/2006 |
| JP | 2008-38941 | 2/2008 |

OTHER PUBLICATIONS

International Search Report of Jul. 30, 2012.

* cited by examiner

*Primary Examiner* — Dirk Wright
(74) *Attorney, Agent, or Firm* — Gerald E. Hespos; Michael J. Porco; Matthew T. Hespos

(57) ABSTRACT

Provided is a gear device capable of resolving inconveniences such as abnormal wear that arises due to the relative misalignment between the internal gear pins and the external gear, and inhibiting an increase in the number of components. This gear device has an outer cylinder, internal gear pins, and a carrier. A plurality of pin grooves extending in the axial direction of the outer cylinder are formed on the inner peripheral face of the outer cylinder, and the internal gear pins are fitted in the pin grooves. The pin grooves are formed so that the length of the pin grooves becomes longer than the length of the internal gear pins. The carrier has a pair of pressing members which includes a pressing surface. The pressing surface is configured to regulate movement of the internal gear pins and an oscillating gear which includes external teeth in the axial direction.

6 Claims, 7 Drawing Sheets

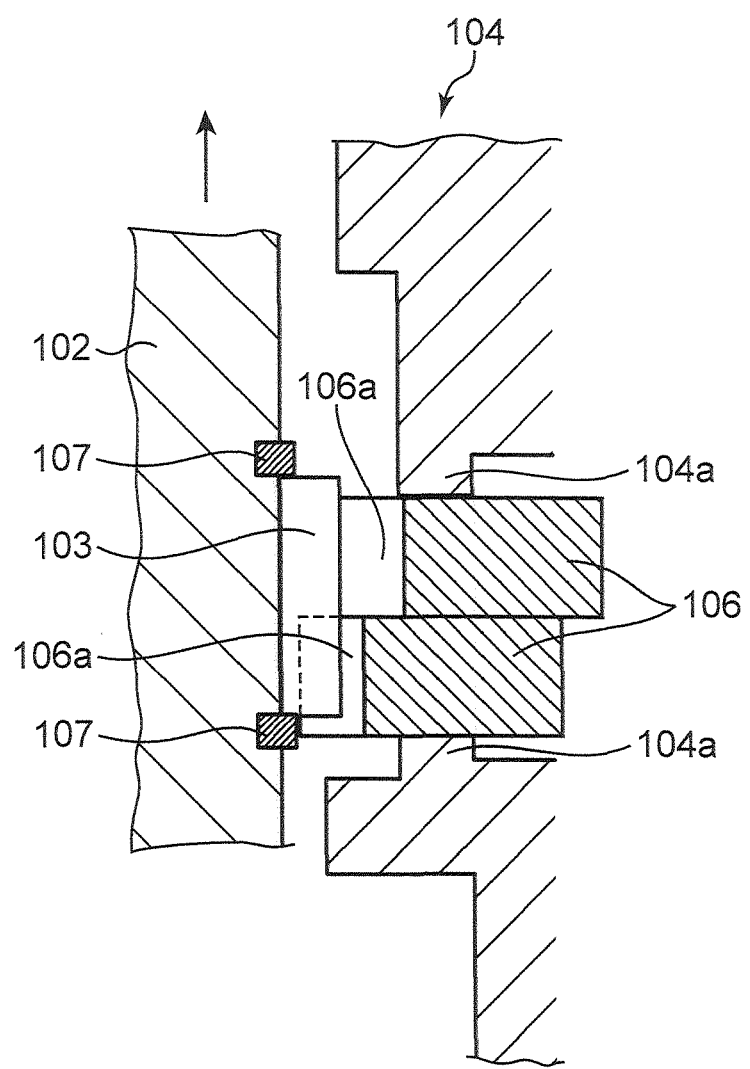

GEAR DEVICE

TECHNICAL FIELD

The present invention relates to a gear device including internal gear pins and an external gear.

BACKGROUND ART

As an eccentrically oscillating gear device for driving members configuring a robot; that is, robot members and the like, conventionally known is a gear device with a built-in main bearing which supports an external load that is applied to the robot members. With this kind of gear device, as described in Japanese Patent Application Publication No. 2005-47006, a carrier is rotatably mounted inside a cylindrical case via a pair of main bearings. A plurality of pin teeth are provided to an inner peripheral face of the cylindrical case. The pin teeth are sandwiched between the pair of main bearings aligned in an axial direction and their movement in the axial direction is thereby regulated. The pin teeth are pin-shaped members. An internal gear is configured as a result of the pin teeth being disposed at regular intervals on the inner peripheral face of the cylindrical case. The pin teeth can engage with external teeth of an oscillating gear which oscillates and rotates in conjunction with the rotation of the crank shaft. With the configuration of this gear device, since the pair of main bearings is housed in a case of the gear device, the robot members can be used by being respectively fixed to the case of the gear device and a carrier, and the main bearing is not required on the side of the robot member.

Here, when a pair of robot members is rotatably coupled to each other via the main bearing provided outside the gear device, the main bearing for receiving the external load of the robot members can be omitted in the gear device. With a gear device that does not have such a main bearing built therein, for example, as with the gear device described in Japanese Examined Utility Model Application Publication No. H4-29988, movement of the internal gear pins in the axial direction is regulated by providing a pair of snap rings to both upper and lower ends of the internal gear pins on the inside of the cylindrical case. Meanwhile, movement of the oscillating gear in the axial direction is regulated by the carrier as with conventional technology.

With a gear device that does not have such a main bearing built therein, variation in the assembly width of the main bearing outside the gear device that occurs due to dimensional errors of components is absorbed by the movement of the relative position of the internal gear pins and the oscillating gear.

With the gear device described in Japanese Examined Utility Model Application Publication No. H4-29988, since movement of the oscillating gear in the axial direction is regulated by the carrier, and movement of the internal gear pins in the axial direction is regulated by a snap ring on the side of the case, variation in the assembly width of the main bearing provided independently from the gear device is absorbed based on the movement of the relative position of the internal gear pins and the oscillating gear. Thus, when the relative shift amount of the internal gear pins and the oscillating gear in the axial direction is large, the contact width and the contact area of the internal gear pins and the oscillating gear will decrease and, consequently, there is a possibility that early breakage such as abnormal wear may occur (for example, refer to the internal gear pin 103 and the oscillating gear 106 shown in FIG. 7).

Moreover, since a pair of snap rings is provided in order to regulate the movement of the internal gear pins in the axial direction, the number of components of the gear device will increase.

SUMMARY OF THE INVENTION

An object of the present invention is to provide a gear device capable of resolving inconveniences such as abnormal wear that arises due to the relative shift of the internal gear pins and the external gear, and inhibiting the increase in the number of components.

The gear device of the present invention is a gear device for transmitting torque, at a predetermined reduction gear ratio, between a pair of partner members mutually coupled relatively and rotatably via a main bearing, this gear device including: an outer cylinder which can be fixed to one partner member; a plurality of internal gear pins which are mounted along an axial direction of the outer cylinder on an inner peripheral face of the outer cylinder; a carrier which is housed inside the outer cylinder and can be fixed to another partner member; a crank shaft which is supported rotatably by the carrier; and an oscillating gear which is supported by the carrier so as to oscillate in conjunction with the rotation of the crank shaft, and which includes external teeth enabled to engage with the internal gear pins, wherein a plurality of pin grooves extending in the axial direction of the outer cylinder are formed on the inner peripheral face of the outer cylinder, and the internal gear pins are fitted in the pin grooves, the pin grooves are formed so that a length of the pin grooves becomes longer than a length of the internal gear pins, and the carrier is configured to regulate movement of the internal gear pins and the oscillating gear in the axial direction.

BRIEF DESCRIPTION OF THE DRAWINGS

FIG. 7 is an enlarged cross section showing a state where the internal gear pin and the oscillating gear of FIG. 6 are relatively shifted in the axial direction.

BEST MODE FOR CARRYING OUT THE INVENTION

Modes for implementing the present invention are now explained in detail with reference to the drawings.

The gear device according to this embodiment is a gear device that is applied as a reduction gear to a revolving superstructure such as a revolving body or a wrist joint of a robot or a revolving superstructure of various machine tools. In the ensuing explanation of this embodiment, described is an example of applying the gear device to a revolving superstructure such as an arm of a robot.

Figure 1:
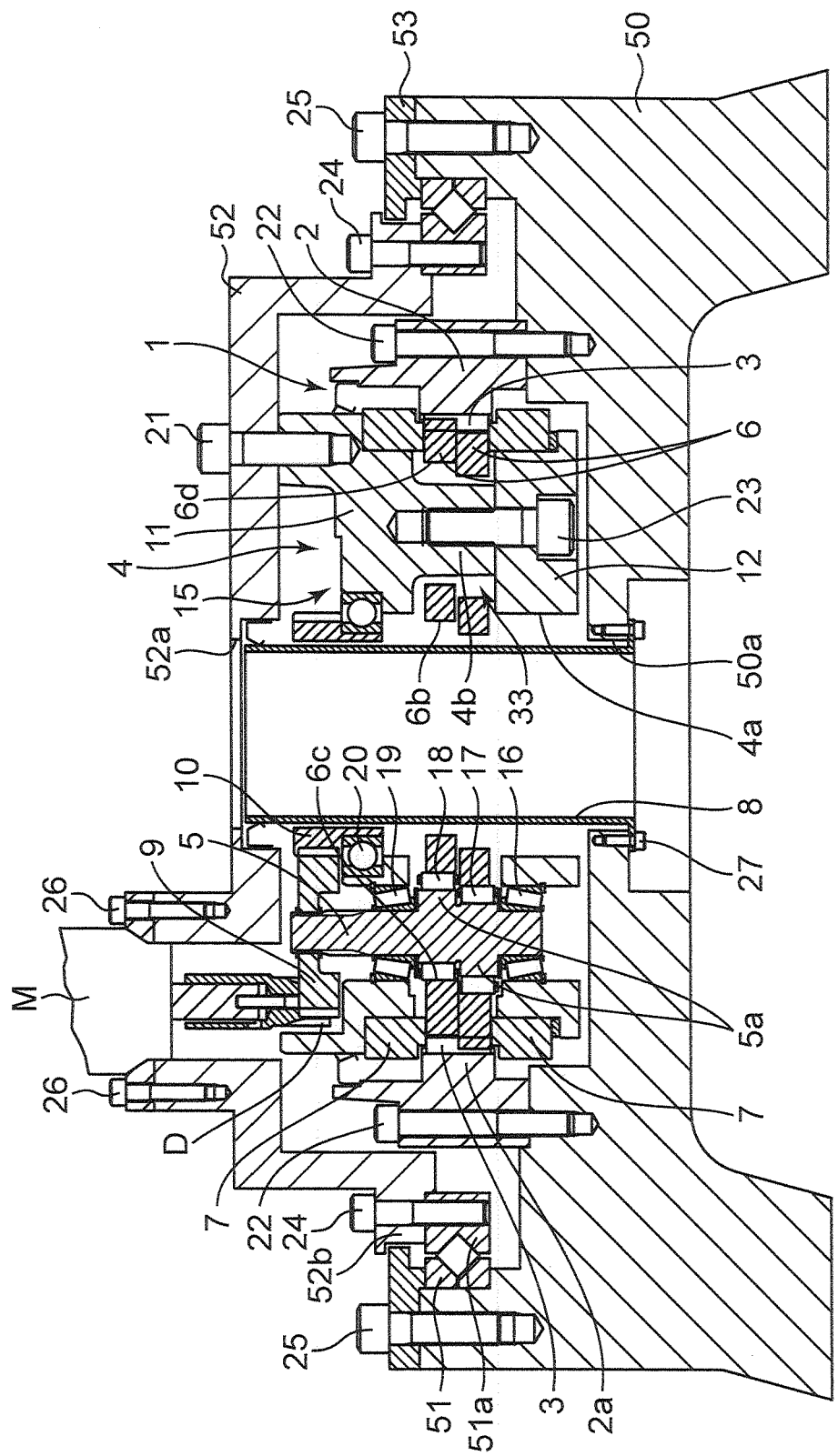
FIG. 1 is a cross section showing the gear device according to an embodiment of the present invention.

The gear device 1 according to this embodiment transmits torque, at a predetermined reduction gear ratio, between a base 50 and a revolving superstructure 52 which are mutually coupled with each other via a main bearing 51 so as to be rotatable relatively as shown in FIG. 1. In other words, the gear device 1 is not equipped with the main bearing 51, and the main bearing 51 is provided between the base 50 and the revolving superstructure 52 outside the gear device 1. The base 50 is included in the concept of one partner member, and the revolving superstructure 52 is included in the concept of another partner member.

The gear device 1 of this embodiment comprises an outer cylinder 2, internal gear pins 3, a carrier 4, crank shafts 5, oscillating gears 6, a cylinder 8, a crank shaft gear 9, and a center gear member 10.

The outer cylinder 2 is a substantial cylindrical member, and functions as a case that configures the outer face of the gear device 1. The outer cylinder 2 is fastened to the base 50 of the robot via a bolt 22. A plurality of pin grooves 13 (refer to FIGS. 2 and 3) extending along an axial direction of the outer cylinder 2 are formed on an inner peripheral face of the outer cylinder 2 at regular intervals along the inner peripheral face of the outer cylinder 2. Internal gear pins 3 are fitted in the respective pin grooves 13. The internal gear pins 3 function as internal teeth with which engage with the oscillating gear 6 configured from an external gear.

Figure 2:
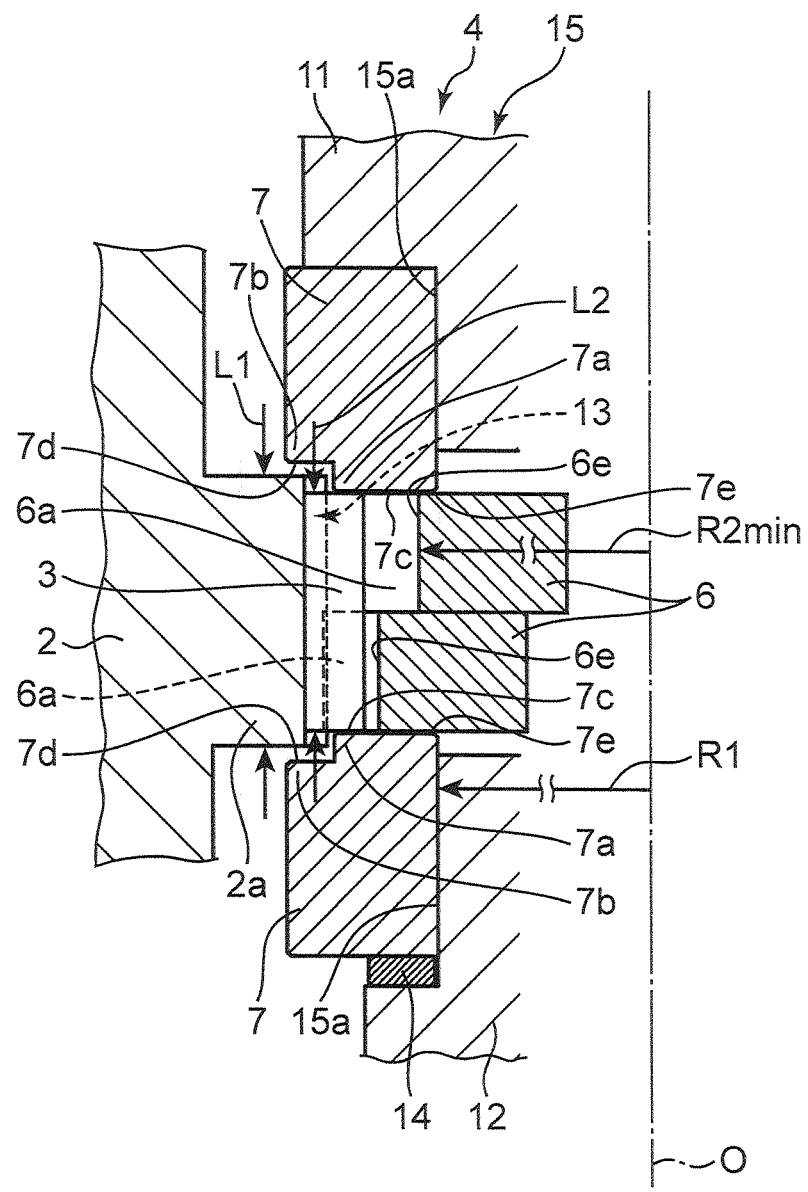
FIG. 2 is an enlarged cross section showing a state where each movement of the internal gear pins and the oscillating gear of FIG. 1 in each of their axial directions is regulated by a carrier-side pressing member.

As shown in FIG. 2, the pin groove 13 is formed such that its length L1 becomes longer (roughly 2 to 4 mm) than a length L2 of the internal gear pins 3. Thus, the internal gear pin 3 can move inside the pin groove 13, within a range of a certain level of backlash (roughly 1 to 2 mm in the front/back direction), along the pin groove 13 (refer to FIGS. 2 and 3).

The carrier 4 is housed in the outer cylinder 2 in a state of being disposed coaxially with the outer cylinder 2. The carrier 4 can relatively rotate around the same axis as the outer cylinder 2. The carrier 4 is fastened to the revolving superstructure 52 via a plurality of bolts 21. As a result of the carrier 4 rotating relatively to the outer cylinder 2, the revolving superstructure 52 can relatively gyrate about the base 50.

Note that, while the carrier 4 is fastened to the revolving superstructure 52 and can gyrate in this embodiment, the outer cylinder 2 is fixed to the base 50 and cannot gyrate. However, the present invention is not limited to the foregoing configuration, and it goes without saying that the gear device 1 can also be used in a state where the outer cylinder 2 is fastened to the revolving superstructure 52, and the carrier 4 is fastened to the base 50.

The carrier 4 of this embodiment comprises a carrier body 15, and a pair of pressing members 7.

The carrier body 15 comprises a base part 11, and an end plate part 12. A housing space 33 for housing the oscillating gear 6 which transmits torque generated between the outer cylinder 2 and the carrier 4 is formed between the base part 11 and the end plate part 12.

The housing space 33 is in communication with a through-hole 4a of the carrier body 15.

The base part 11 includes a shaft part 4b extending in an axial direction toward the end plate part 12. The shaft part 4b is fastened to the end plate part 12 via a bolt 23. The base part 11 and the end plate part 12 are manufactured from a cast iron or the like.

The pair of pressing members 7 is ring-shaped members as shown in FIGS. 1 and 2, and is each fitted into a recess 15a formed on the outer peripheral side face of the carrier body 15.

The pair of pressing members 7 each comprise a main body 7a, and a stepped part 7b. The main body 7a includes a pressing surface 7c for coming into contact with the internal gear pin 3 and the oscillating gear 6. The pressing surfaces 7c of the pair of pressing members 7 are disposed to face each other. As a result of the pressing surfaces 7c coming into contact with end faces facing the respective axial directions of the internal gear pins 3 and the oscillating gear 6, the pressing surface 7c can regulate the movement of the internal gear pins 3 and the oscillating gear 6 in their respective axial directions.

The stepped part 7b is a portion that is protruding in a radial direction of the pressing member 7 from the main body 7a toward the outer cylinder 2 in order to prevent the outer cylinder 2 from being removed. faces 7d in which the stepped parts 7b face each other are each disposed at a position that is shifted in a direction away from the internal gear pin 3 relative to the adjacent pressing surface 7c. A protrusion 2a which protrudes inward from the inner peripheral face of the outer cylinder 2 is inserted into a gap that is sandwiched by the stepped parts 7b of the pair of pressing members 7.

Figure 3:
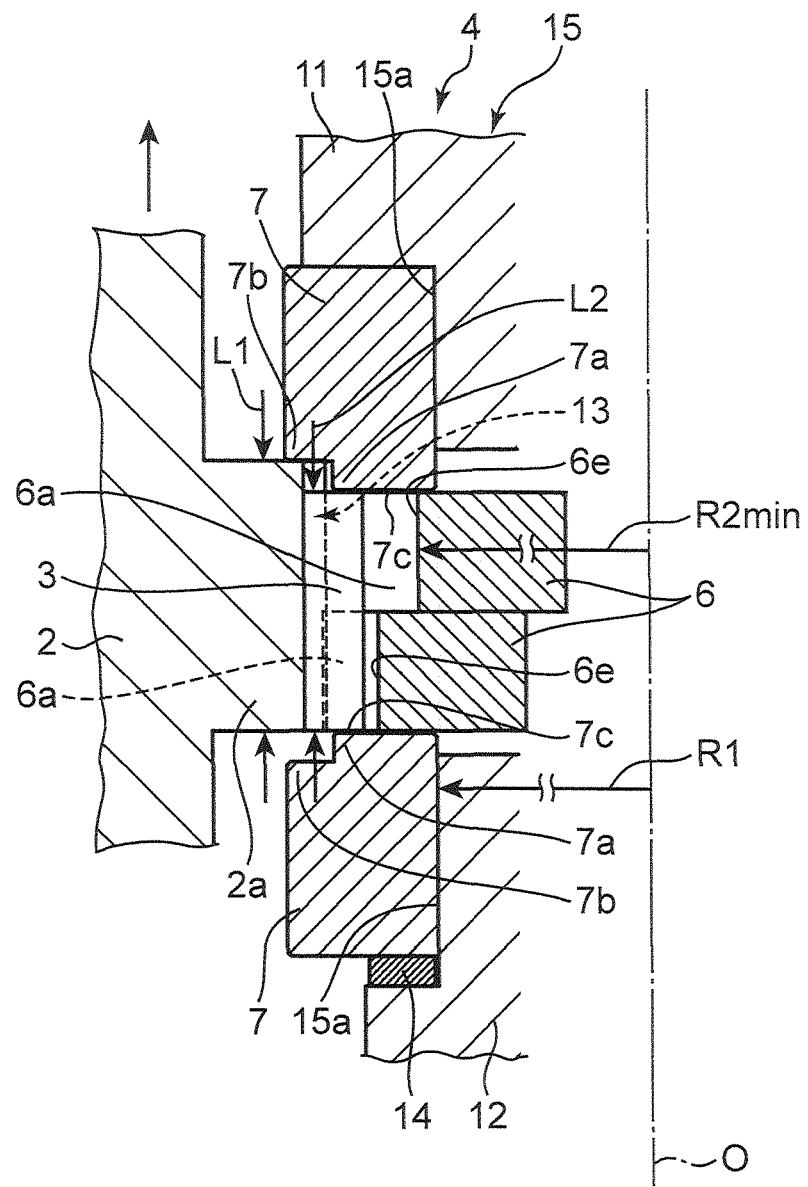
FIG. 3 is an enlarged cross section showing a state where the carrier-side pressing member of FIG. 1 prevents the outer cylinder from being removed.
Figure 4:
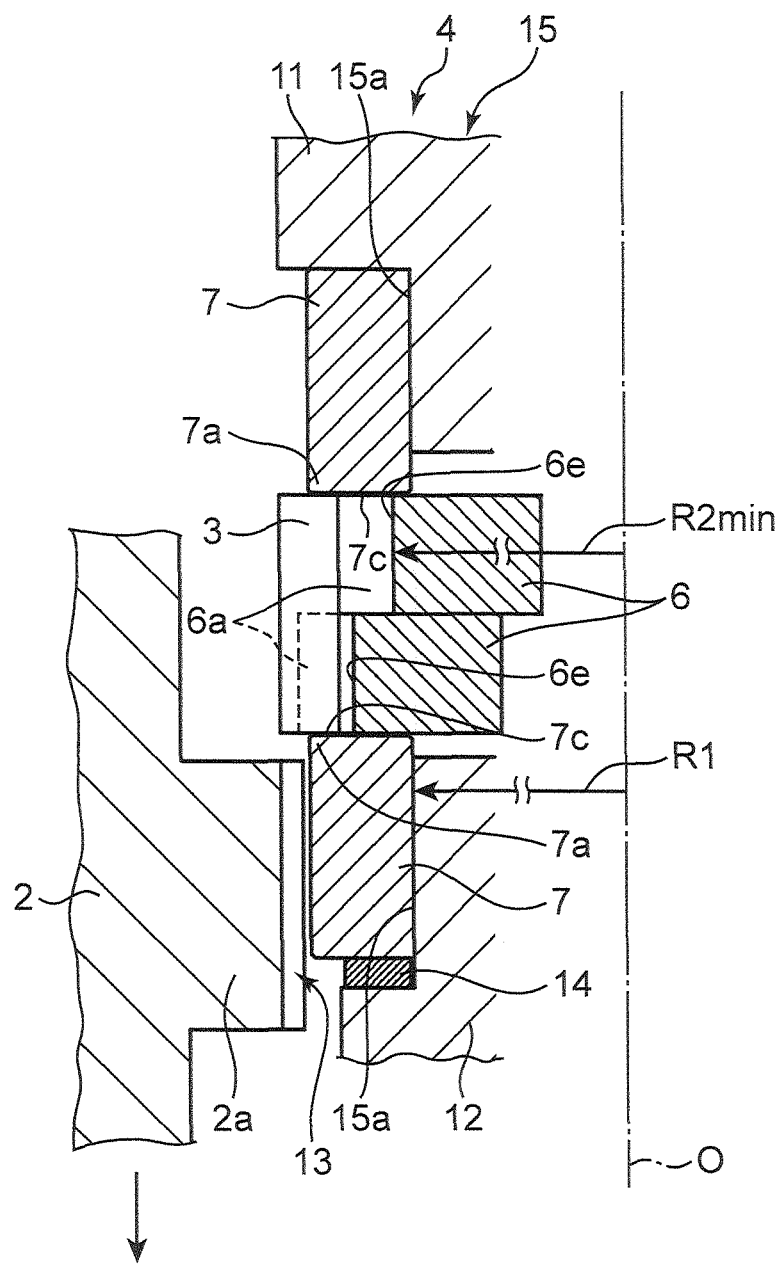
FIG. 4 is an explanatory diagram of a cross section showing a state where the outer cylinder comes off from the carrier when the stopper part is omitted from the pressing member.

As shown in FIGS. 2 and 3, when the outer cylinder 2 and the carrier 4 relatively move in the axial direction, the protrusion 2a regulates the outer cylinder 2 from moving relatively in the axial direction relative to the carrier 4 by coming into contact with one of the faces 7d facing the pair of stepped parts 7b. Moreover, since the protrusion 2a comes into contact with the face 7d facing the stepped part 7b, as shown in FIG. 4, it is possible to prevent the outer cylinder 2 from falling out of the carrier 4; that is, it is possible to prevent the outer cylinder 2 from being removed.

An internal diameter R1 of the pressing member 7 is set, as shown in FIG. 2, to be smaller than a minimum value R2min of a distance from a tooth bottom 6e of external teeth 6a of the oscillating gear 6 to a center O of the pressing member 7. Here, the minimum value R2min of the distance from the tooth bottom 6e of the external teeth 6a of the oscillating gear 6 to the center O of the pressing member 7 is the distance from the tooth bottom 6e of the external teeth 6a of the oscillating gear 6 to the center O of the pressing member 7 when the oscillating gear 6 is on the innermost side in a case where the oscillating gear 6 oscillates in conjunction with the rotation of the crank shaft 5.

The pressing member 7 of this embodiment is manufactured from a material capable of obtaining higher finishing accuracy than the material (cast iron or the like) of the carrier body 15, for instance, from a steel material or the like. Consequently, the pressing surface 7c that comes into contact with the internal gear pin 3 and the oscillating gear 6 can be subject to a surface finish with high finishing accuracy.

As shown in FIG. 1, the center gear member 10 is rotatably coupled to the carrier 4 via a bearing 20 within the through-hole 4a of the carrier 4. Moreover, an insertion hole penetrating in the axial direction is provided to the center of the center gear member 10, and the cylinder 8 is inserted through the insertion hole.

The cylinder 8 is inserted through the through-hole 4a of the carrier 4. The cylinder 8 extends linearly in the center axial direction of the carrier 4. A wire cable or the like is inserted through within the cylinder 8. The cylinder 8 prevents the cable and the respective gears and the like inside the gear device from coming into contact with each other, and prevents lubricating oil or the like from infiltrating therein. The cylinder 8 is coupled to the base 50 via a bolt 27.

A plurality of crank shafts 5 are disposed at regular intervals around the cylinder 8. A crank shaft gear 9 is mounted to the end of each crank shaft 5. Each crank shaft gear 9 is interlocked with the center gear member 10. One of the plurality of crank shaft gears 9 is interlocked with a drive gear D which is driven by a motor M as a drive source. The other crank shaft gears 9 can receive the rotational drive force of the motor M via the center gear member 10. Consequently, the respective crank shaft gears 9 can transmit the rotational drive force of the motor M to the crank shafts 5. The respective crank shafts 5 are rotatably supported by the carrier 4 via a pair of crank bearings 16, 19.

The crank shaft 5 includes a plurality of (two in this embodiment) eccentric parts 5a. The plurality of eccentric parts 5a are disposed so as to be aligned in the axial direction at a position between the pair of crank bearings 16, 19. Each eccentric part 5a is formed in a cylindrical shape that is decentered at a predetermined eccentricity from the shaft center of each crank shaft 5. In addition, each eccentric part 5a is formed on the crank shaft 5 so as to mutually have a phase difference of a predetermined angle.

The oscillating gear 6 is supported by the carrier 4 so as to oscillate in conjunction with the rotation of the crank shaft 5. In this embodiment, two oscillating gears 6 are provided to the carrier 4. The two oscillating gears 6 are mounted on the respective eccentric parts 5a of the crank shafts 5 via roller bearings 17, 18, respectively. The oscillating gear 6 is formed to be slightly smaller than the internal diameter of the outer cylinder 2, and oscillates and rotates while interlocking with the internal gear pins 3 on the inner face of the outer cylinder 2 in conjunction with the eccentric rotation of the eccentric part 5a when the crank shaft 5 rotates.

The respective oscillating gears 6 include, as shown in FIGS. 1 and 2, external teeth 6a that can interlock with the internal gear pins 3, a center part through-hole 6b, a plurality of eccentric part insertion holes 6c, and a plurality of shaft part insertion holes 6d. The cylinder 8 is inserted through the center part through-hole 6b with a backlash. The number of teeth (number of external teeth 6a) of the oscillating gear 6 is slightly fewer than the number of internal gear pins 3.

The eccentric part insertion holes 6c are provided at regular intervals in a peripheral direction around the center part through-hole 6b in the oscillating gear 6. The eccentric part 5a of each crank shaft 5 is inserted through each eccentric part insertion hole 6c in a state where the roller bearings 17, 18 are interposed therebetween.

The shaft part insertion holes 6d are provided at regular intervals in a peripheral direction around the center part through-hole 6b in the oscillating gear 6. Each shaft part insertion hole 6d is disposed at a position that is between the eccentric part insertion holes 6c in the peripheral direction. Through each shaft part insertion hole 6d is inserted each shaft part 4b of the carrier 4 with a backlash.

In this embodiment, the main bearing 51 is fitted into the inner peripheral face of the base 50, and fixed via the ring-shaped lid 53 so that it will not fall out from the inside of the base 50. The lid 53 is screwed to the upper face of the base 50 via a bolt 25. In addition, an inner movable portion 51a of the main bearing 51 is coupled with an outer peripheral flange portion 52b of the revolving superstructure 52 via a bolt 24. Consequently, the base 50 and the revolving superstructure 52 are relatively and rotatably coupled to each other via the main bearing 51.

The operation of the gear device 1 according to this embodiment is now explained.

When one crank shaft gear 9 receives the rotational drive force from the motor M, that rotational drive force is transmitted to each of the other crank shaft gears 9 via the center gear member 10. Consequently, each crank shaft 5 rotates about its axis.

In addition, pursuant to the rotation of the respective crank shafts 5, the eccentric parts 5a of that crank shaft 5 rotate eccentrically. Consequently, the oscillating gears 6 oscillate and rotate while interlocking with the internal gear pins 3 on the inner face of the outer cylinder 2 in conjunction with the eccentric rotation of the eccentric parts 5a. The oscillating rotation of the oscillating gear 6 is transmitted to the carrier 4 via the respective crank shafts 5. In this embodiment, since the outer cylinder 2 is fixed to the base 50 and immovable, the carrier 4 and the revolving superstructure 52 can rotate relative to the outer cylinder 2 and the base 50 at a rotating speed which was decelerated from the input rotation.

(Features of this Embodiment)

(1) With the gear device 1 of this embodiment, the pin grooves 13 are formed such that the length L1 of the pin grooves 13 formed on the inner peripheral face of the outer cylinder 2 becomes longer than the length L2 of the internal gear pins 3. Consequently, the backlash for enabling the internal gear pin 3 to move in the axial direction within the pin grooves 13 can be ensured, and variation in the assembly width of the main bearing 51 on the outside that arises due to the dimensional error of components or other factors can be absorbed. Moreover, since there is no fear of the internal gear pins 3 protruding from the end of the pin grooves 13 in the axial direction, it is possible to reliably prevent the abnormal wear and the like of the internal gear pins 3.

Furthermore, the carrier 4 is configured to regulate the movement of the internal gear pins 3 and the oscillating gear 6 in the axial direction. Specifically, the movement of both the internal gear pin 3 and the oscillating gear 6 in the axial direction is regulated by the pressing surface 7c of the pressing member 7 provided on the side of the carrier 4. Consequently, it is possible to reliably prevent the internal gear pin 3 and the oscillating gear 6 from relatively shifting in the axial direction, and thereby reliably prevent early breakage such as abnormal wear.

In addition, there is no need to provide to the outer cylinder 2 a component such as a snap ring for regulating the movement of the internal gear pins 3 in the axial direction as with conventional technology. Consequently, it is possible to inhibit the increase in the number of components, and the assembly work is thereby facilitated.

Figure 5:
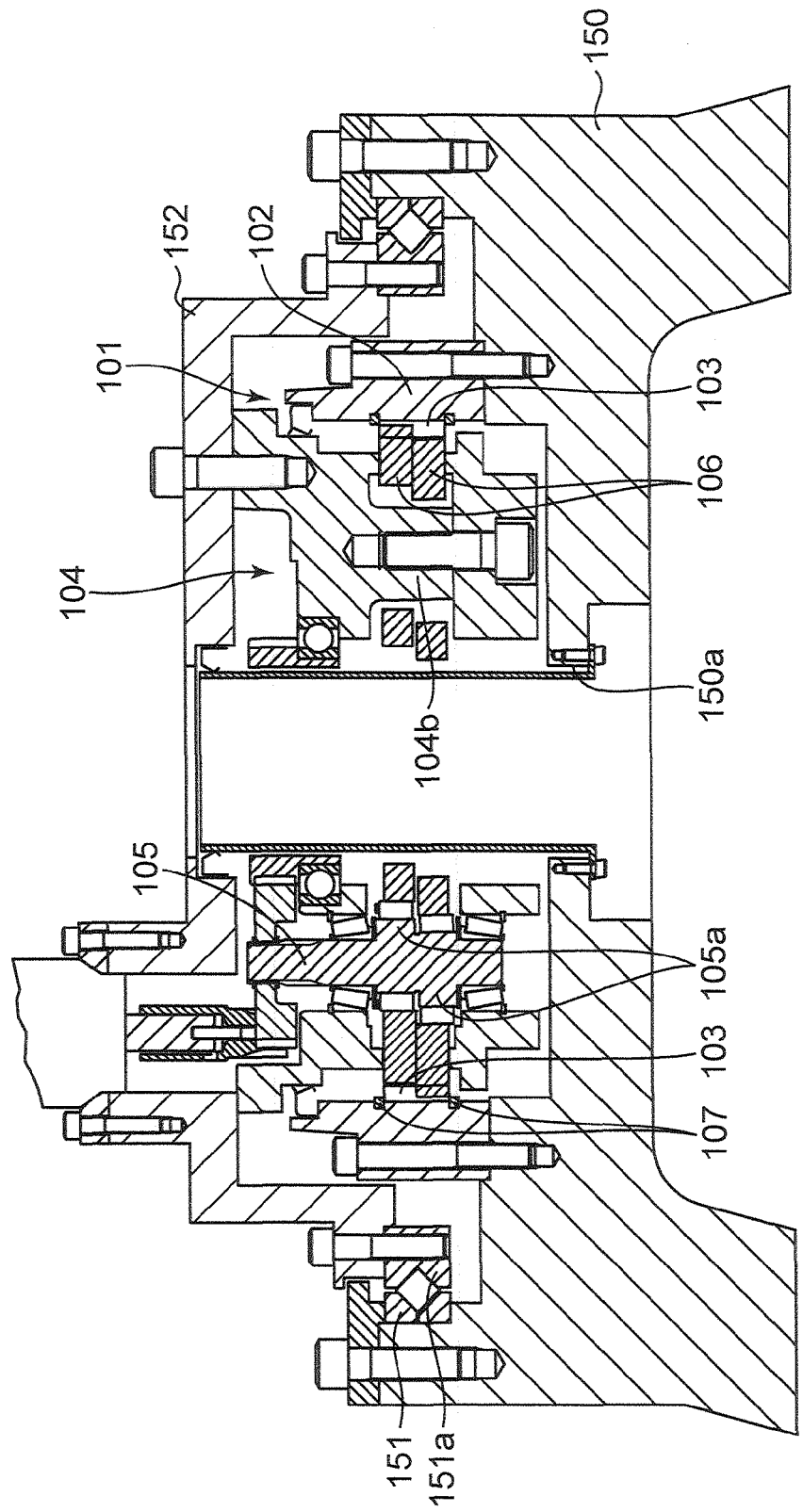
FIG. 5 is a cross section showing a conventional gear device comprising a snap ring for regulating the movement of an internal gear pin in the axial direction, which is a comparative example of the present invention.
Figure 6:
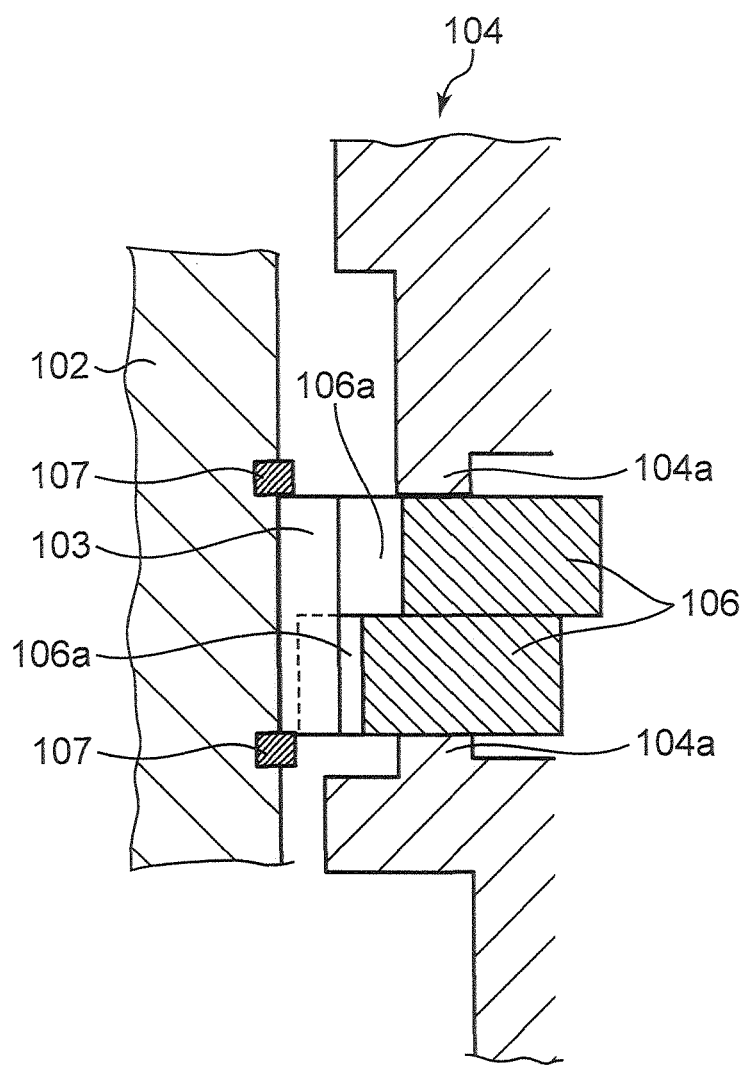
FIG. 6 is an enlarged cross section showing a state where movement of the internal gear pins of FIG. 5 in the axial direction is regulated by the snap ring on the side of the outer cylinder, and movement of the oscillating gear in the axial direction is regulated by the carrier.

As a comparative example of the gear device of the present invention, a gear device 101 comprising a pair of snap rings 107 for regulating the movement of the internal gear pins 103 in the axial direction as shown in FIGS. 5 to 7 is now explained in detail. The gear device 101 transmits torque, at a predetermined reduction gear ratio, between a base 150 and a revolving superstructure 152 which are mutually coupled relatively and rotatably via a main bearing 151, and comprises an outer cylinder 102, a plurality of internal gear pins 103 disposed at regular intervals on the inner peripheral face of the outer cylinder 102, a carrier 104, crank shafts 105 rotatably supported by the carrier 104, two oscillating gears 106 which are oscillated by the crank shaft 105, and a pair of snap rings 107. The pair of snap rings 107 can regulate the movement of the internal gear pins 103 in the axial direction as shown in FIGS. 5 and 6 by coming into contact with both upper and lower ends of the internal gear pins 103. Meanwhile, movement of the oscillating gear 106 from both upper and lower ends in the axial direction is regulated by a pair of protrusions 104a protruding in the axial direction in the carrier 104. Consequently, as shown in FIG. 6, variation in the assembly width of the main bearing 151 is absorbed by the movement of the relative position of the internal gear pins 103 and the oscillating gear 106.

However, as shown in FIG. 7, when the relative shift amount of the internal gear pins 103 and the oscillating gear 106 in the axial direction is large, the contact width and the contact area of the internal gear pins 103 and the oscillating gear 106 will decrease and, consequently, there is a possibility that early breakage such as abnormal wear may occur.

Meanwhile, with the gear device 1 of this embodiment, as shown in FIG. 3, since the relative movement of the internal gear pins 3 and the oscillating gear 6 in the axial direction is regulated by the pressing surface 7c provided on the side of the carrier 4, relative shift of the internal gear pins 103 and the oscillating gear 106 in the axial direction will not occur as with the gear device 101 shown in FIGS. 5 to 7, and it is possible to reliably prevent early breakage such as abnormal wear.

Moreover, with the gear device 1 of this embodiment, even if the carrier 4 and the outer cylinder 2 relatively shift in the axial direction due to the variation in the assembly width of the external main bearing 51, since the internal gear pin 3 and the oscillating gear 6 can respectively move in the axial direction, within the range of the long pin grooves 13, in a state where both ends are pressed by the pressing surface 7c, it is possible to absorb the foregoing variation in the assembly width of the main bearing 51.

(2) With the gear device 1 of this embodiment, the carrier 4 comprises a carrier body 15, and a pressing member 7 disposed on the outer peripheral side face of the carrier body 15. The pressing member 7 includes a pressing surface 7c which regulates the movement of the internal gear pins 3 and the oscillating gear 6 in the axial direction by coming into contact with the internal gear pin 3 and the oscillating gear 6. According to this configuration, the pressing member 7 including the pressing surface 7c which regulates the movement of the internal gear pins 3 and the oscillating gear 6 in the axial direction is disposed on the outer peripheral face of the carrier body 15. Thus, the pressing surface 7c can be easily disposed in a manner of coming into contact with the internal gear pin 3 and the oscillating gear 6, and the shift of the internal gear pins 3 and the oscillating gear 6 in the axial direction can be reliably prevented. Furthermore, since the carrier body 15 can also be applied to gear devices 1 of different specifications merely by changing the pressing member 7, the common parts utilization of the carrier body 15 is possible. In addition, since the carrier body 15 and the pressing member 7 are independently configured, the material of the pressing member 7 can be selected and processed independently from the selection and processing of the material of the carrier body 15. Accordingly, the surface roughness of the pressing surface 7c can be improved easily.

(3) With the gear device 1 of this embodiment, the carrier 4 includes a stepped part 7b capable of regulating the outer cylinder 2 from moving relatively in the axial direction relative to the carrier 4. A protrusion 2a capable of coming into contact with the stepped part 7b is formed on the inner peripheral face of the outer cylinder 2. With this configuration, as a result of the stepped part 7b formed on the pressing member 7 of the carrier 4 (stepped part 7b for preventing the outer cylinder 2 from being removed) coming into contact with the protrusion 2a of the inner peripheral face of the outer cylinder 2, it is possible to regulate the relative movement of the outer cylinder 2 in the axial direction relative to the carrier 4. Thus, it is possible to prevent the outer cylinder 2 from falling off with fewer number of components.

Here, with a conventional gear device (for example, refer to FIG. 1 of Japanese Patent Application Publication No. 2000-213605), in a state where the external main bearing is not mounted, it is necessary to insert an oil seal inside the case in advance in order to prevent the case from falling out from the carrier, and there is a problem in that the condition of the oil seal cannot be observed after the gear device is assembled. Meanwhile, with the gear device of this embodiment, since an oil seal to function as a stopper is no longer required, it is possible to inhibit the increase in the number of components.

(4) With the gear device 1 of this embodiment, as shown in FIG. 2, since the pressing member 7 is formed in a ring shape, and the internal diameter R1 of the pressing member 7 is set to be smaller than the minimum value R2min of the distance from the tooth bottom 6e of the external teeth 6a of the oscillating gear 6 to the center O of the pressing member 7, it is possible to avoid the drawback of the external teeth 6a of the oscillating gear 6 interfering with the inner corner part 7e of the pressing member 7.

(Modified Examples)

(A) With the gear device 1 of the foregoing embodiment, while the carrier body 15 configuring the carrier 4 and the pressing member 7 independent of each other, the present invention is not limited thereto, and the carrier body 15 and the pressing member 7 may also be molded integrally. In the foregoing case, it is possible to further inhibit the increase in the number of components.

(B) With the gear device 1 of this embodiment, as shown in FIGS. 2 and 3, while the stepped part 7b for preventing the outer cylinder 2 from being removed is formed on the pressing member 7, the present invention is not limited thereto, and the stepped part 7b which functions as the stopper may also be omitted. In the foregoing case, the outer cylinder 2 may be prevented from being removed, using an oil seal (not shown) or the like provided to the outer peripheral face of the carrier 4.

(C) In this embodiment, as shown in FIGS. 1 to 3, while an example of the gear device 1 comprising two oscillating gears 6 was explained, the present invention is not limited thereto, and the present invention can also be applied to a structure comprising only one oscillating gear 6, or a structure comprising three or more oscillating gears 6.

The invention claimed is:

1. A gear device for transmitting torque, at a predetermined reduction gear ratio, between a pair of partner members mutually coupled relatively and rotatably via a main bearing, the gear device comprising:
   an outer cylinder which can be fixed to one partner member;
   a plurality of internal gear pins which are mounted along an axial direction of the outer cylinder on an inner peripheral face of the outer cylinder;
   a carrier which is housed inside the outer cylinder and can be fixed to another partner member;
   a crank shaft which is supported rotatably by the carrier; and
   an oscillating gear which is supported by the carrier so as to oscillate in conjunction with the rotation of the crank shaft, and which includes external teeth enabled to engage with the internal gear pins, wherein
   a plurality of pin grooves extending in the axial direction of the outer cylinder are formed on the inner peripheral face of the outer cylinder, and the internal gear pins are fitted in the pin grooves, the pin grooves are formed so that a length of the pin grooves becomes longer than a length of the internal gear pins, and the carrier is configured to regulate movement of the internal gear pins and the oscillating gear in the axial direction.

2. The gear device according to claim 1, wherein the carrier comprises a carrier body, and a pressing member which is disposed on an outer peripheral side face of the carrier body, and the pressing member includes a pressing surface which regulates movement of the internal gear pins and the oscillating gear in the axial direction by coming into contact with the internal gear pins and the oscillating gear.

3. The gear device according to claim 1, wherein the carrier includes a stepped part for preventing the outer cylinder from being removed, the stepped part enabled to regulate the outer cylinder from moving relative to the carrier in the axial direction, and a protrusion capable of coming into contact with the stepped part is formed on the inner peripheral face of the outer cylinder.

4. The gear device according to claim 2, wherein the pressing member is formed in a ring shape, and an internal diameter of the pressing member is set to be smaller than a minimum value of a distance from a tooth bottom of the external teeth of the oscillating gear to a center of the pressing member.

5. The gear device according to claim 2, wherein the carrier includes a stepped part for preventing the outer cylinder from being removed, the stepped part enabled to regulate the outer cylinder from moving relative to the carrier in the axial direction, and a protrusion capable of coming into contact with the stepped part is formed on the inner peripheral face of the outer cylinder.

6. The gear device according to claim 3, wherein the pressing member is formed in a ring shape, and an internal diameter of the pressing member is set to be smaller than a minimum value of a distance from a tooth bottom of the external teeth of the oscillating gear to a center of the pressing member.

* * * * *